Dec. 15, 1970 A. C. R. HOWARD 3,547,502

RECTILINEAR MOTION BEARINGS

Filed Feb. 17, 1969

INVENTOR
Alan Charles Richard Howard
BY Holman, Glascock, Downing & Seebold
ATTORNEYS

United States Patent Office 3,547,502

Patented Dec. 15, 1970

1

3,547,502

RECTILINEAR MOTION BEARINGS

Alan Charles Richard Howard, Chalton, England, assignor to Rotax Limited, London, England Filed Feb. 17, 1969, Ser. No. 799,583

Claims priority, application Great Britain, Feb. 19, 1968, 7,950/68

Int. Cl. F16c *29/06*

U.S. Cl. 308—6 3 Claims

ABSTRACT OF THE DISCLOSURE

A rectilinear motion bearing having a tubular housing in which is defined three slots, the slots serving to accommodate channel pieces in which are located rollers which bear against a shaft. Intermediate the channel pieces and the bases of the slots are formed return grooves through which the rollers traverse between the opposite ends of the channel members, as the shaft and body part move relative to each other.

This invention relates to rectilinear motion bearings and has for its object to provide such a bearing in a simple and convenient form.

A rectilinear motion bearing in accordance with the invention comprises in combination, a tubular body part having at least three equi-angularly spaced axially extending slots formed in its internal periphery, carrier pieces mounted in the slots respectively, said carrier pieces being of channel section, the open sides of the channels being directed inwardly and the rear faces of the carrier pieces being spaced from the bases of the slots, so as to define return channels respectively, a shaft extending through the body part, said shaft having flat bearing surfaces disposed opposite said carrier pieces respectively, sets of rollers disposed in the channels respectively, and acting as bearings to locate the shaft within the body part and to permit relative axial movement thereof, and a pair of end closures mounted at the opposite ends of the body part, said end closure or parts located relative thereto defining return paths whereby during relative axial movement of the body part and the shaft, rollers leaving the channel portions of said carrier pieces will be guided into the associated return channels and vice versa.

One example of a rectilinear motion bearing in accordance with the invention will now be described with reference to the accompanying drawings in which.

Figure 1:
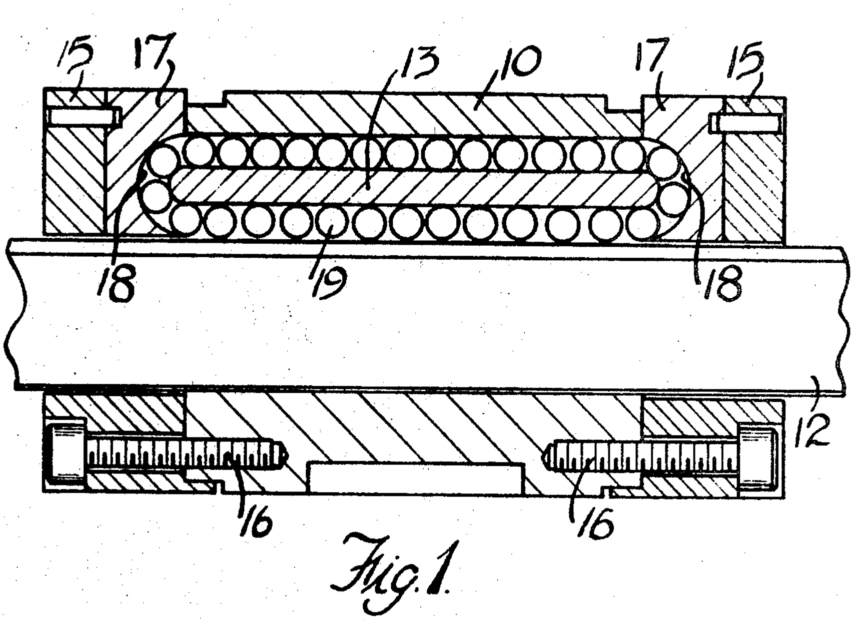
FIG. 1 is a sectional side elevation of the bearing.
Figure 2:
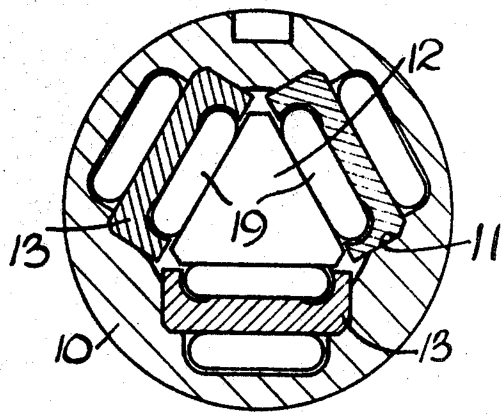
FIG. 2 is a section through an intermediate portion of the bearing.

Referring to the drawings, there is provided a substantially tubular body part, 10 having formed on its internal periphery, three axially extending and equi-angularly spaced slots 11. Extending within the body part is a shaft 12 of triangular section, the flat sides of which define bearing surfaces which are presented respectively to the slots 11.

Each slot is of stepped form having its wider portion disposed inwardly. Furthermore, the wider portion of each slot is fitted with a carrier piece 13 which is of generally channel section having its open side directed inwardly towards the shaft. The space between the base wall of the slot 11 and the associated carrier piece defines a return channel, and positioned at opposite end of the body part are end closures 15 which are secured to the body

2 part by screws 16, each end closure supports three pieces 17 in which are formed return paths 18 respectively.

Mounted intermediate the bearing surfaces of the shaft and the base faces of the carrier pieces are rollers 19 having rounded ends, and the rollers serve to locate the shaft and the body part for relative axial movement. During such movement, the rollers move axially within the body part, and move through the return paths 18 into the return channels and vice versa. In this manner a circulation of the rollers is ensured.

The side faces of the channels in the carrier pieces are rounded and extend around the ends of the rollers so as to prevent the rollers 19 falling out in the event that the shaft 12 is removed. The ends of the base portions of the channel pieces are rounded and extend into the recess portion of the pieces 17 respectively. Moreover, it will be appreciated that the pieces 17 may be formed integrally with the end closures 15, but if they are not formed integrally, the parts are retained relative to each other by means of pins extending from the end closures to the aforesaid pieces.

The material from which the various parts of the bearing are made depend upon the duty which the bearing is to perform. For heavy duty bearings, all the parts will be of steel, suitably hardened on the appropriate surfaces. In some instances, however, the end closures 15 together with the pieces 17 may be formed from a synthetic resin material, such for instance, as p.t.f.e.

Having thus described my invention what I claim as new and desire to secure by Letters Patent is:

1. A rectilinear motion bearing comprising in combination, a tubular body part having at least three equi-angularly spaced axially extending slots formed in it internal periphery, carrier pieces mounted in the slots respectively, said carrier pieces being of channel section, the open sides of the channels being directed inwardly and the rear faces of the carrier pieces being spaced from the bases of the slots, so as to define return channel respectively, a shaft extending through the body part, said shaft having flat bearing surfaces disposed opposite said carrier pieces respectively, sets of rollers disposed in the channels respectively, and acting as bearing to locate the shaft within the body part and to permit relative axial movement thereof, and a pair of end closures mounted at the opposite ends of the body part, said end closures of parts located relative thereto defining return paths whereby during relative axial movement of the body part and the shaft, rollers leaving the channel portions of said carrier pieces will be guided into the associated return channels and vice versa.

2. A bearing as claimed in claim 1 in which each of said slots is of stepped form, the wider portion of each slot being directed inwardly towards the shaft and accommodating the associated channel.

3. A bearing as claimed in claim 1 in which the side faces of each channel are rounded and extend around the rounded ends of the rollers thereby to retain the rollers in position in the event that the shaft is removed.

References Cited

UNITED STATES PATENTS 2,620,163 12/1952 Stone .............. 64—23

FRED C. MATTERN, Jr., Primary Examiner

F. SUSKO, Assistant Examiner